United States Patent [19]

Freitag et al.

[11] Patent Number: 4,600,753

[45] Date of Patent: Jul. 15, 1986

[54] TWO STAGE PROCESS FOR THE PRODUCTION OF AROMATIC POLYESTER-CARBONATE

[75] Inventors: Dieter Freitag; Claus H. Wulff, both of Krefeld; Gerhard Henes, Leverkusen; Ludwig Bottenbruch; Peter Tacke, both of Krefeld, all of Fed. Rep. of Germany

[73] Assignee: Bayer Aktiengesellschaft, Leverkusen, Fed. Rep. of Germany

[21] Appl. No.: 680,156

[22] Filed: Dec. 10, 1984

[30] Foreign Application Priority Data

Dec. 24, 1983 [DE] Fed. Rep. of Germany ....... 3346945

[51] Int. Cl.$^4$ ............................................. C08G 63/64
[52] U.S. Cl. .................................... 525/439; 525/462; 528/176; 528/179; 528/182
[58] Field of Search ............... 525/439, 462; 528/176, 528/179, 182

[56] References Cited

U.S. PATENT DOCUMENTS

| | | | |
|---|---|---|---|
| 4,238,596 | 12/1980 | Quinn | 525/439 |
| 4,252,939 | 2/1981 | Mori et al. | 528/182 |
| 4,388,455 | 6/1983 | Bales | 528/176 |

*Primary Examiner*—Harold D. Anderson
*Attorney, Agent, or Firm*—Connolly and Hutz

[57] ABSTRACT

The invention relates to a process for the preparation of aromatic polyester-carbonates wherein, in a first stage, aromatic oligo-esters or oligo-ester-carbonates having hydroxyl end groups are prepared from diaryl esters of aromatic dicarboxylic acids (or their starting materials) and diphenols and, optionally, a diaryl carbonate, by trans-esterification in the melt, and in a second stage these oligo-esters or oligo-ester-carbonates are condensed with phosgene by the phase boundary process to give the polyester-carbonate.

7 Claims, No Drawings

TWO STAGE PROCESS FOR THE PRODUCTION OF AROMATIC POLYESTER-CARBONATE

The invention relates to a process for the preparation of aromatic polyester-carbonates wherein, in a first stage, aromatic oligo-esters or oligo-ester-carbonates having hydroxyl end groups are prepared from diaryl esters of aromatic dicarboxylic acids (or from the starting materials of these diaryl esters) and diphenols, and, optionally, phosgene, by trans-esterification in the melt, and in a second stage these oligo-esters or oligo-ester-carbonates are condensed with phosgene by the phase boundary process to give the polyester-carbonate.

The polyester-carbonates thus obtained have outstanding properties. Aromatic polyester-carbonates are known. They can be prepared, for example, by melt trans-esterification (according to DE-OS (German Published Specification) Nos. 1,495,626 and 2,232,877). However, this process does not give colourless polyester-carbonates, since the material is subjected to excessive heat exposure, especially at the end of the polycondensation.

Aromatic polyester-carbonates can also be obtained by reacting aromatic dicarboxylic acid dichlorides with diphenols in tertiary amines as solvents, in the presence of acid acceptors, for example according to DE-OS (German Published Specification) No. 1,420,475. The total removal of the tertiary amine from the end product presents problems. These products also tend to discolour during thermoplastic processing.

The aromatic polyester-carbonates having the best colour are obtained by the phase boundary process from aromatic dicarboxylic acid dichlorides, diphenolates and phosgene. This process is also known, for example from European Pat. No. 10,840 and DE-OS (German Published Specification) No. 3,007,934. The process requires specially prepurified aromatic dicarboxylic acid dichlorides. Their handling is difficult because they are solid at room temperature and have only a limited shelf life. Metal traces and moisture must be carefully kept out.

Accordingly, the invention is based on the recognition that by a certain combination of elements of the melt trans-esterification process and the phase boundary process polyester-carbonates having an excellent intrinsic colour, heat stability and hydrolysis resistance are obtained. Polyester-carbonates having this combination of properties were not previously known.

It is to be regarded as particularly surprising that impurities in the technical grades of the aromatic dicarboxylic acids interfere to a substantially lesser extent in the case of polyester-carbonates which have been prepared by the process according to the invention than in the case of products which have been obtained from the same technical dicarboxylic acids but via the acid dichlorides.

The properties of the polyester-carbonates can be improved by purifying the acid dichlorides or acid diaryl esters, for example by distillation. It has been found that a given purification effort has a substantially more advantageous effect on the end product when following the reaction route via the diaryl ester than when the reaction is carried out via the acid dichlorides.

The subject of the invention is a process for the preparation of aromatic polyester-carbonates, which is characterised in that in a first stage diaryl esters of an aromatic dicarboxylic acid (or their starting materials, i.e. mixtures of aromatic dicarboxylic acid and diphenyl carbonate) and, optionally, additionally a diaryl carbonate are reacted with 1.01 to 100 moles of diphenol (per mole of diaryl ester) in the melt, optionally in the presence of catalysts, chain terminators and/or branching agents, until an oligomer having a molecular weight of 650 to 25,000 has been produced and thereafter, in a second stage, the oligomer is condensed with phosgene using the phase boundary process, in the presence of tertiary amines and/or quaternary ammonium salts, optionally after addition of chain-terminators and/or branching agents, to give the aromatic polyester carbonate.

The procedure in the first stage is basically known from DE-OS (German Published Specification) No. 2,232,877 and the procedure of the second stage is basically known from DE-OS (German Published Specification) No. 3,007,934.

In the first stage, high-boiling inert organic solvents, for example diphenyl ether and ditolyl ether, may be present to facilitate the reaction.

In a particular embodiment, diphenols can be reacted with the starting materials of the diaryl esters, i.e. with mixtures of aromatic dicarboxylic acids and diaryl-carbonates, in which case the polyester blocks obtained contain carbonate groups to a significant degree if more than 2 moles of diaryl carbonates are employed per mole of the aromatic dicarboxylic acid.

As catalysts for the melt trans-esterification in the first stage may be used, inter alia: compounds of Ca, Ag, Mg, Zn, Sn, Mn, Fe, Co, Ni, Ti, As and Sb as well as alkali metal hydroxides and alkaline earth metal hydroxides and their basic salts, for example $(BuO)_2SnO$, $Ti(OBu)_4$, NaOH and sodium phenolate. Further possible catalysts are 5-membered and 6-membered aromatic bases having 1 to 3 N atoms, for example imidazole.

These catalysts can be employed individually or conjointly in amounts totalling 0.05 to 3% by weight, based on diphenol.

Possible catalysts for the second stage are in particular: triethylamine, tributylamine, n-ethylpiperidine, N-ethylmorpholine, tetrabutylammonium halide and trimethylbenzylammonium halide, preferably in amounts of 0.1 to 3, especially 0.1 to 1, mole%, based on diphenol.

In the second stage, the oligomeric ester blocks are condensed further with a carbonyl halide, preferably phosgene, optionally with the addition of further diphenol and/or dicarboxylic acid dichloride, by the phase boundary process in the presence of tertiary amines or quaternary ammonium salts as catalysts, at pH 9 to 14, to give the polyester-carbonate. The procedure of the second stage is described in DE-OS (German Published Specification) No. 3,007,934.

A particularly preferred embodiment consists in employing only such an amount of alkali metal hydroxide that the pH value during the phosgenation is kept at 10 to 12 and that the catalyst is only added after the phosgenation.

Chain terminators for limiting the molecular weight can be introduced both in the first and in the second stage. Preferably, the chain stoppers are added after the phosgenation.

Chain terminators which can be added during the first stage are monophenols, or aromatic and aliphatic monocarboxylic acids wherein aromatic rings can carry up to 3 branched and/or unbranched alkyl substituents, each with up to 18 C atoms. The aliphatic monocarboxylic acids can contain up to 25 C atoms.

Suitable chain terminators which can be employed during the second stage are all unsubstituted and alkyl-substituted phenols, their chlorocarbonic acid esters and aromatic carboxylic acid halides mentioned in the test of DE-OS (German Published Specification) No. 3,007,934. The chain stoppers mentioned in the claim of DE-OS (German Published Specification) No. 3,007,934 are preferred. In addition, aromatic monocarboxylic acid halides which are unsubstituted or substituted with up to 3 $C_1$-$C_7$-alkyl groups, and aliphatic monocarboxylic acid halides with up to 25 C atoms, can be used.

Chain branching agents can be employed, even during the first stage of the process according to the invention, in the form of trifunctional and higher-functional carboxylic acids and phenols. The chain stoppers used during the second stage have already been described in DE-OS (German Published Specification) No. 3,007,934.

Preferred diphenols for the preparation of the aromatic polyester-carbonates according to the invention are compounds of the formula I $$HO-Z-OH \quad (I)$$

wherein Z denotes a divalent mononuclear or polynuclear aromatic radical with 6 to 30 C atoms, Z being of such a structure that the two OH groups are each directly bonded to a C atom of an aromatic system.

Particularly preferred diphenols are compounds of of the formula II

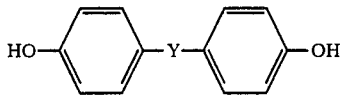
(II)

in which Y denotes a single bond, an alkylene or alkylidene radical with 1 to 7 C atoms, a cycloalkylene or cycloalkylidene radical with 5 to 12 C atoms,

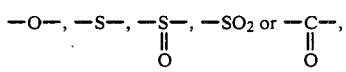

as well as their nuclear-alkylated and nuclear-halogenated derivatives, for example hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl) ethers, bis-(hydroxyphenyl)-ketones, bis-(hydroxyphenyl)-sulphoxides, bis-(hydroxyphenyl)-sulphones and $\alpha,\alpha'$-bis-(hydroxyphenyl)-diisopropylbenzenes, as well as their nuclear-alkylated and nuclear-halogenated compounds, in particular, for example, bisphenol A=2,2-bis-(4-hydroxyphenyl)-propane, tetramethyl-bisphenol A, 1,1-bis-(4-hydroxyphenyl)-isobutane, 1,1-bis-(4-hydroxyphenyl)-cyclohexane, 4,4'-dihydroxydiphenyl-sulphide, 4,4'-dihydroxydiphenyl, 4,4'-dihydroxydiphenyl-sulphone and their dihalogenated and tetrahalogenated derivatives. Bisphenol A particularly preferred. Any desired mixtures of the abovementioned diphenols can also be used.

As dicarboxylic acids for the aromatic polyester-carbonates according to the invention there are to be mentioned, inter alia: terephthalic acid, isophthalic acid, o-phthalic acid, diphenyl-dicarboxylic acid, diphenyl-ether-dicarboxylic acid, naphthalenedicarboxylic acid and mixtures of these.

The average length of the oligomeric aromatic ester blocks obtained in the first stage can be controlled through the choice of the molar ratio of dicarboxylic acid (ester) to diphenol. In the ester blocks prepared by the process according to the invention the ratio of the two starting components is in the range 1:1.01 to 1:100, preferably 1:1.05 to 1:30. The content of carbonate in the oligomeric ester blocks of the first stage can be as much as 90 mole% (based on the sum of carboxylic acid ester and carbonate). The number-average molecular weight of the oligo-ester blocks, $\overline{M}_n$, preferably ranges from 1,000 to 8,000.

The ester and carbonate structures in the first stage may be present in block distribution or random distribution.

Aromatic polyester-carbonates according to the invention as a rule have relative solution viscosities of 1.15 to 3.0, preferably of 1.2 to 1.5 (measured on a solution of 0.5 g of polyester-carbonate in 100 ml of $CH_2Cl_2$ solution at 250° C.). They preferably have a content of ester groups, calculated on the basis of the sum of ester and carbonate groups, of 7 to 86, more preferably of 42 to 74, mol-%.

The aromatic polyester-carbonates prepared according to the invention can contain stabilisers, lubricants, plasticisers, mould release agents, reinforcing agents and fillers, such as, for example, glass fibres, glass beads, asbestos fibres, carbon fibres, kieselguhr, kaolin, chalk, rock powder and pigments.

The aromatic polyester-carbonates prepared according to the invention can be processed by conventional methods on injection moulding machines to give mouldings or on extruders to give semi-finished goods.

The moulding compositions are preferably used wherever the quality of moulding has to meet particularly high standards in respect of intrinsic colour, transparency, hydrolysis resistance, heat distortion resistance and stability to oxidative degradation.

EXAMPLES

Description of the method for colour number measurement

Spectroscopic colour number determination

Granules of the aromatic polyester whose colour number is to be determined are dissolved in methylene chloride (concentration 4 g/100 ml). The measurements are carried out on a 10 cm thick layer, using a spectrometer of type "Cary 219" from Messrs. Cary, U.S.

The light transmission I at a wavelength of 420 nm and the light transmission $I_o$ at a wavelength of 700 nm, are measured in comparison with pure methylene chloride. The colour number of the granules, measured at 420 nm, is calculated from the equation:

$$\text{Colour number}_{(420\ nm)} = 11.5 \times 10 \text{ g} \frac{I_o}{I}$$

Determination of heat stability

About 3 g of the granulated polyester-carbonate, in a 100 ml glass flask under a vacuum of 20 mbar, are dipped in a salt bath and 330° C. (up to where the neck starts) and left in the bath for 15 minutes after the material has melted; the flask in then taken out of the bath and the substance is allowed to cool in vacuo. The change in the relative solution viscosity at this temperature of the melt is a measure of the heat stability of the sample. In addition, the thermal-oxidative degradation was determined by measuring the notched impact strength of injection-moulded standard small bars after 500 hours' storage in air at 150° C.

Determination of hydrolysis resistance

Injection-moulded standard small bars were kept in boiling water for 500 hours and the hydrolysis resistance was assessed from the change in notched impact strength.

Technical-grade isophthalic acid and terephthalic acid from Amoco, type I PA 99 and TA 33, were used for the investigations. The bisphenol A employed was a technical-grade product from Bayer AG.

The corresponding acid dichlorides were prepared from the dicarboxylic acids in accordance with DE-OS (German Published Specification) No. 3,040,294 by heating with excess $SOCl_2$. The dicarboxylic acid dichlorides were employed either as crude products—directly after distilling off the excess $SOCl_2$— or after having been distilled themselves.

COMPARATIVE EXAMPLE 1

Aromatic polyester-carbonate with 70 mole% ester content, produced from crude dicarboxylic acid dichlorides 2.736 kg of bisphenol A (BPA), 1.5 liters of 45% strength by weight aqueous sodium hydroxide solution, 8.4 g of sodium borohydride, 36 liters of water and 22 liters of methylene chloride were introduced, under a nitrogen atmosphere, into a steel kettle having an intensive-action stirrer, and the mixture was stirred until the BPA had completely dissolved.

A solution of 852.72 g each of crude isophthalic acid dichloride and terephthalic acid dichloride, dissolved in 3 liters of methylene chloride, was then introduced in the course of 15 minutes into the intensively stirred two-phase mixture, while cooling with water, and stirring was thereafter continued for 1 hour. The temperature of the reaction mixture did not rise above 22° C. The pH value of the mixture was kept at 12 to 13 by addition of sodium hydroxide.

After adding and dissolving 86.6 g (3.5 mole-%) of p-isooctyl phenol, 600 g of phosgene were passed in over the course of 20 minutes, with continued stirring, the temperature again being kept at about 20° C. and the pH value at 10 to 12. 120 g of triethylamine were then added and stirring was continued for 1 hour.

After having separated off the aqueous alkaline phase, the organic phase was washed first with dilute phosphoric acid and then with water until salt-free, and about 50% of the methylene chloride was distilled off under normal pressure. The solution which remained was diluted with 15 liters of chlorobenzene and the distillation of the methylene chloride was continued until the temperature at the bottom of the apparatus was about 80° C.; the polyester-carbonate was then freed from chlorobenzene in a vacuum extruder at 320° C., drawn off as a strand and granulated. The granules had a relative solution viscosity $\eta_{rel}$ of 1.261.

COMPARATIVE EXAMPLE 2

Aromatic polyester-carbonate with 30 mole% ester content, prepared from crude dicarboxylic acid dichlorides 2.736 kg of BPA, 1.5 liters of 45% strength by weight sodium hydroxide solution, 8.4 g of sodium borohydride, 36 liters of water and 22 liters of methylene chloride were stirred in a steel kettle, until the BPA had dissolved, as described in Comparative Example 1.

A solution of 365.46 g each of isophthalic acid dichloride and terephthalic acid dichloride dissolved in 3 liters of methylene chloride was then introduced in the course of 15 minutes, and 10 minutes later 1,450 g of phosgene were introduced into the vigorously stirred two-phase mixture, the temperature of the latter not exceeding 22° C. and the pH value being at 12 to 13 (cooling, and additional sodium hydroxide, being employed).

After the acid dichlorides had been introduced, 86.6 g of p-isooctyl phenol and, after it had been dissolved, 120 ml of a 4% strength by weight aqueous solution of triethylamine was added, following which vigorous stirring was continued for 1 hour.

The batch was worked up as described in Comparative Example 1. The granules obtained had a relative solution viscosity $\eta_{rel}$ of 1.263.

COMPARATIVE EXAMPLE 3

Polyester-carbonate as in Comparative Example 1, but using distilled dicarboxylic acid dishlorides. The relative solution viscosity of the product obtained was 1.269.

COMPARATIVE EXAMPLE 4

Polyester-carbonate as in Comparative Example 2, but using distilled dicarboxylic acid dichlorides.

The relative solution viscosity of the product obtained was 1.264.

EXAMPLE 1 (according to the invention)

An aromatic polyester-carbonate, with 70 mole% ester content, prepared from technical-grade dicarboxylic acid. 2,736 g of bisphenol A (12 moles), 698 g each of isophthalic acid and terephthalic acid (4.2 moles each), 3,770 g of diphenyl carbonate (17.6 moles) and 1 g each of Na phenolate and imidazole were heated to 200° C. for 1 hour, with stirring, after which a vacuum of 800 mbar was applied and the phenol formed was distilled off. When no more phenol passed over under these conditions, a vacuum of 20 mbar was applied and the temperature was raised to 230° C. until, once again, no more phenol distilled. The remaining phenol was distilled at about 1 mbar and 250° C. The melt obtained was then poured onto metal trays, and cooled, under $N_2$. The entire reaction lasted 7.5 hours.

The almost colourless, brittle material obtained was dissolved in 22 liters of methylene chloride and added, in the steel kettle used for Comparative Example 1, to 36 liters of water, 8.4 g of Na borohyride, 120 g of triethylamine and 0.5 liter of 45% strength by weight aqueous NaOH. 600 g of phosgene were passed in over the course of 20 minutes, with vigorous stirring, 43.8 g of p-isooctylphenol were then added and stirring was continued for 1 hour. During this time, the temperature of the reaction mixture was 20° to 22° C. The pH value was kept at 10 to 12 by adding dilute NaOH.

The batch was worked up as described for Comparative Example 1. The product had a relative solution viscosity of 1.275.

EXAMPLE 2 (according to the invention)

Aromatic polyester-carbonate with 70 mole% ester content, based on distilled diphenyl ester of isophthalic acid and terephthalic acid.

2,736 g of bisphenol A, 1,337 g each of diphenyl isophthalate and diphenyl terephthalate and 1 g each of Na phenolate and (BuO)$_2$SnO were reacted as described in Example 1 and the precondensate obtained was subsequently further processed by the phase boundary method. The material obtained had a $\eta_{rel}$ value of 1.268.

EXAMPLE 3 (according to the invention)

Aromatic polyester-carbonate with 30 mole% ester content, prepared from technical-grade dicarboxylic acids. 2,736 g of bisphenol A (12 moles), 299 g each of isophthalic acid and terephthalic acid (1.8 moles each), 1,628 g of diphenyl carbonate (7.6 moles) and 1 g of Ti(OBu)$_4$ were reacted, as described in Example 1, to give an almost colourless precondensate. The polyester-carbonate obtained on subsequent further processing by the phase boundary method had a relative solution viscosity of 1.270.

EXAMPLE 4 (according to the invention)

Aromatic polyester-carbonate with 30 mole% ester content, based on the distilled diphenyl esters of isophthalic acid and terephthalic acid.

2,736 g of bisphenol A, 573 g each of diphenyl isophthalate and diphenyl terephthalate and 1 g each of Na phenolate and (BuO)$_2$ were reacted as described in Example 3, and the precondensate obtained was subsequently further processed by the phase boundary method.

A $\eta_{rel}$ value of 1.264 was measured on the product.

We claim:

1. A process for the production of an aromatic polyester-carbonate in which, in a first stage a diaryl ester of at least one aromatic dicarboxylic acid, or a mixture of at least one aromatic dicarboxylic acid and diphenyl carbonate, is reacted with 1.01 to 100 moles of at least one diphenol, per mole of diaryl ester, in the melt until an oligomer having a number-average molecular weight of 650 to 25,000 has been produced and thereafter, in a second stage, the oligomer is condensed with phosgene, using the phase boundary process, in the presence of a tertiary amine, a quaternary ammonium salt or a mixture of both to give the aromatic polyester-carbonate.

2. A process according to claim 1, in which the first stage is carried out in the presence of a catalyst, a chain terminator or a branching agent.

3. A process according to claim 1 or 2, in which the first stage is carried out in the presence of diphenyl ether or ditolyl ether as solvent.

4. A process according to claim 1 or 2, in which the second stage is carried out using only such an amount of alkali metal hydroxide required to keep the pH value during phosgenation at 10 to 12, and adding the catalyst only after the phosgenation.

5. A process according to claim 1 or 2, in which the second stage is carried out in the presence of a chain terminator or a branching agent.

6. A process according to claim 1 or 2 in which the diphenol is reacted with a mixture of aromatic dicarboxylic acid and diaryl carbonate wherein more than 2 moles of diaryl carbonate per mole of aromatic dicarboxylic acid are present in the first stage reaction.

7. A process according to claim 1 or 2 wherein the first stage contains an additional diaryl carbonate as a reactant.

TABLE 1

Properties of the polyester-carbonates prepared

| Product of | $\eta_{rel}$ (1) | Notched impact strength kJ/m$^2$ (2) | Colour number | Heat stability $\eta_{rel}$ after heating the melt | $a_k$ after 500 hours' storage in air at 150° C. | $a_k$ after 500 hours' storage in water at 100° C. |
|---|---|---|---|---|---|---|
| Comparative Example 1 | 1.268 | 23.4 | 16.8 | 1.235 | 5.9 | 5.3 |
| Comparative Example 2 | 1.271 | 34.7 | 17.3 | 1.226 | 8.5 | 4.1 |
| Comparative Example 3 | 1.269 | 25.5 | 13.7 | 1.253 | 6.1 | 5.1 |
| Comparative Example 4 | 1.264 | 36.8 | 13.6 | 1.247 | 8.9 | 6.4 |
| Example 1 | 1.275 | 24.4 | 12.2 | 1.268 | 18.0 | 14.1 |
| Example 2 | 1.268 | 25.3 | 7.5 | 1.263 | 19.3 | 16.5 |
| Example 3 | 1.270 | 36.8 | 8.7 | 1.264 | 22.2 | 18.0 |
| Example 4 | 1.264 | 37.4 | 5.9 | 1.263 | 23.5 | 19.3 |

(1) $\eta_{rel}$ = relative solution viscosity measured on a solution of 0.5 g of polyester-carbonate in 100 ml of CH$_2$Cl$_2$ solution at 25° C.
(2) Notched impact strength $a_k$ determined according to DIN 53 453